Patented Feb. 24, 1931

1,794,229

UNITED STATES PATENT OFFICE

SAMUEL L. HOYT, OF SCHENECTADY, NEW YORK, ASSIGNOR TO GENERAL ELECTRIC COMPANY, A CORPORATION OF NEW YORK

METHOD OF MAKING HARD METAL COMPOSITIONS

No Drawing. Application filed December 5, 1929. Serial No. 411,986.

The present invention relates to hard metal compositions or products, and more particularly to sintered hard metal compositions of the character described in Schröter Patents Nos. 1,549,615 and 1,712,416. According to the process disclosed in the Schröter patents a powdered carbide of an element of the 6th group of Mendelejeff's periodic table, such as tungsten carbide, is mixed with a powdered auxiliary binder or cementing metal of the iron group such as cobalt. The mixed materials are pressed into shape under a pressure of about 60,000 pounds per square inch and then sintered into a hard mass at a temperature of about 1375° C. the temperature employed varying with the content of auxiliary metal in the composition.

In my prior application Serial No. 181,536, filed April 6, 1927, I have described a further method for forming a composition of the character described in the above Schröter patents into a hard, dense mass suitable for use as a cutting tool. The method described in my prior application consists briefly in the application of pressure to the mixed powdered materials while they are simultaneously heated to their sintering temperature.

It is one of the objects of the present invention to provide an improved process whereby a hard metal composition may be produced which has the strength and lack of temperature sensitivity of the product described in the Schröter patents and at the same time the extreme hardness and density of the article produced in accordance with the process described in my prior application, Serial No. 181,536.

In carrying out my invention, powdered tungsten carbide and cobalt are mixed in the proportion of about 3 to 20% cobalt with 97 to 80% tungsten carbide and pressed into a desired shape in a mold and under a pressure of about 60,000 pounds per square inch. The pressed material is then placed in a closed carbon tube and heated to a sintering temperature of about 1375° C. in a hydrogen furnace. This product is similar to that produced in accordance with the process disclosed in the above Schröter patents.
The material thus produced is usually in the form of a tool bit which may be brazed or welded to a suitable supporting shank. It is hard and tough and substantially insensitive to temperature. For example, the tool bit it capable of taking heavy cuts at high speed. Under such conditions a small portion of the tool bit will be heated to a dull red color but the cuttting efficiency of the tool bit will remain substantially unaffected.

In accordance with my invention the tool bit formed as above described is placed in a carbon mold such as disclosed in my prior application, Serial No. 181,536 so that the bit is confined on all sides. Pressure of about 1000 pounds per square inch is then applied to the bit while it is simultaneously heated by an electric current to a temperature in the neighborhood of 1375° C. When treated in this manner the hardness and density of the pressed material are increased while the other physical properties remain unimpaired.

While I prefer to employ a mixture of tungsten carbide and cobalt, it will be obvious that other carbides and other cementing metals may be employed without departing from the scope of the present invention.

What I claim as new and desire to secure by Letters Patents of the United States, is:

1. The method of making a hard, tough, metallic composition which comprises mixing powdered tungsten carbide with a cementing metal, pressing the powdered mixture into a desired form, sintering it into a hard mass and then simultaneously applying pressure to the mass while it is heated to a sintering temperature.

2. The method of making a hard, tough, metallic composition which comprises mixing a powdered carbide of an element of the 6th group of Mendelejeff's periodic table with a metal of the iron group, pressing the powdered mixture into a desired form, sintering it into a hard mass and then simultaneously applying pressure to the mass while it is heated at a relatively high temperature.

3. The method of making a hard, tough, metallic composition which comprises mixing powdered tungsten carbide and cobalt, pressing the powdered mixture, sintering it into a hard mass, and then applying pressure to the mass while it is heated at a relatively high temperature.

4. The method of making a hard, tough, metallic composition which comprises mixing powdered tungsten carbide and cobalt, pressing the materials, sintering it into a hard mass, cooling it and then heating the mass to its sintering temperature and simultaneously applying pressure thereto.

5. The method of making a hard, tough, metallic mass consisting mainly of tungsten carbide but containing an appreciable amount of cobalt which comprises pressing the tungsten carbide and cobalt while finely divided into a desired form, sintering the pressed material, placing the sintered mass into a mold so that it is confined in a lateral direction and applying pressure to said mass while it is heated to a temperature in the neighborhood of 1375° C.

6. The method of making a hard, tough, metallic composition which comprises mixing 3 to 20% cobalt with 97 to 80% tungsten carbide, pressing the mixture into the desired form, sintering the mixture into a hard mass and thereafter heating the mass to a temperature of about 1375° C. and simultaneously applying pressure thereto.

In witness whereof, I have hereunto set my hand this 4th day of December, 1929.

SAMUEL L. HOYT.